(12) United States Patent
Skarbek et al.

(10) Patent No.: US 7,471,833 B2
(45) Date of Patent: Dec. 30, 2008

(54) METHOD AND APPARATUS FOR PROCESSING IMAGE DATA

(75) Inventors: Wladyslaw Skarbek, Warsaw (PL); Miroslaw Bober, Guildford (GB)

(73) Assignee: Mitsubishi Electric Corporation, Tokyo (JP)

( * ) Notice: Subject to any disclaimer, the term of this patent is extended or adjusted under 35 U.S.C. 154(b) by 692 days.

(21) Appl. No.: 10/621,377

(22) Filed: Jul. 18, 2003

(65) Prior Publication Data
US 2004/0076329 A1  Apr. 22, 2004

(30) Foreign Application Priority Data
Jul. 19, 2002  (EP) .................................. 02255068

(51) Int. Cl.
G06K 9/62 (2006.01)
G06K 9/68 (2006.01)
G06K 9/70 (2006.01)
G06K 9/00 (2006.01)

(52) U.S. Cl. ...................... 382/226; 382/224; 382/225; 382/118

(58) Field of Classification Search ................ 382/224, 382/225, 226, 159, 118
See application file for complete search history.

(56) References Cited

U.S. PATENT DOCUMENTS 5,561,718 A * 10/1996 Trew et al. .................. 382/118
6,563,952 B1 * 5/2003 Srivastava et al. ........... 382/225
6,661,908 B1 * 12/2003 Suchard et al. ............. 382/119

OTHER PUBLICATIONS

Bezdek, Coray, Gunderson and Watson, "Detection and Characterization of Cluster Substructure. I. Linear structure: Fuzzy c-Lines", SIAM J. Appl. Math., vol. 40, 1981.
Wladyslaw Skarbek and Krystian Ignasiak, "Handwritten Digit Recognition by Local Principal Components Analysis", in "Foundation of Intelligent Systems", eds.: Ras, Z.W., Skowron, A., pp. 217-226, Lecture Notes in Artificial Intelligence, Springer, 1997 (papers of International Symposium, ISMIS '97, Charlotte, USA, Oct. 1997).
Shuguan Wu and Mita D. Desai, "Adaptive tree-structured subspace classification of hyperspectral images", Image Processing, 1998, ICIP 98. Proceedings. 1998 International Conference in Chicago, IL, USA, Oct. 4-7, 1998, Los Alamitos, CA, USA, IEEE Comput. Soc, US, Oct. 4, 1998, pp. 570-573, XP010308809, ISBN: 0-8186-8821-1.
Daniel L. Swets and John (Juyang) Weng, "Discriminant Analysis and Eigenspace Partition Tree for Face and Object Recognition from Views", Automatic face and Gesture Recognition, 1996, Proceedings of the Second International Conference on Killinton, VT, USA Oct. 14-16, 1996, Los Alamitos, CA, USA, IEEE Comput. Soc, US, Oct. 14, 1996, pp. 192-197, XP010200419, ISBN: 0-8186-7713-9.

(Continued)

Primary Examiner—Matthew C Bella
Assistant Examiner—John B Strege
(74) Attorney, Agent, or Firm—Birch, Stewart, Kolasch & Birch, LLP (57) ABSTRACT

A method of representing a data distribution derived from an object or image by processing signals corresponding to the object or image comprising deriving an approximate representation of the data distribution and analysing the errors of the data elements when expressed in terms of the approximate representation.

27 Claims, 10 Drawing Sheets

Face representation with HFLPCA

OTHER PUBLICATIONS

R. Cappelli et al., "Multispace KL for Pattern Representation and Classification", IEEE Transactions on Pattern Analysis and Machine Intelligence, Sep. 2001, IEEE Comput. Soc, USA, vol. 23, No. 9, pp. 977-996, XP002227828, ISSN: 0162-8828.

International Organisation for Standardisation Organisation Internationale de Normalisation ISO/IEC JTC1/SC29/WG11 Coding of Moving Pictures and Audio, Shanghai, 2002, Warsaw University of Technology, "Extending face recognition descriptor using hierarchical fuzzy local PCA", Oct. 14, 2002.

"A Wavelet Tour of Signal Processing", Stephane Mallat, Ecole Polytechnique, Paris, 1998, Academic Press.

"Neural Networks and Principal Component Analysis", Konstantinos I. Diamantaras, Technological Education Institute of Thessaloniki, XP008089422.

B.D. Ripley, Pattern Recognition and Neural Networks, Cambridge, 1996, 122-131.

P.J. Huber, Projection Pursuit, The Annuals of Statistics 13(2): 435-476, 1985, XP8014587.

J.H. Friedman et al., Projection Regression, J. Am. Stat. Ass 76(376): 817-823, 1981 XP8093638.

V. Cherkassky et al., Learning from Data, Wiley 1998, 155-158, 253-259, 270-302.

J.H. Friedman, Multivariate Adaptive Regression Splines, The Annals of Stat. 19(1):1-141, 1981, XP9059384.

\* cited by examiner

Face representation with HFLPCA

Fig. 9A – Query Descriptor Q

Fig. 9B – Database Descriptor D

Fig. 9C – Common chain A between the Q and D descriptors

Fig. 9D – Common chain B between the Q and D descriptors

METHOD AND APPARATUS FOR PROCESSING IMAGE DATA

The invention relates to a method and apparatus for analysing and representing distributions of multi-dimensional data, and for classifying data items. The invention is especially concerned with image data and analysis of image or video content, in techniques such as object and face localisation or recognition.

Compact representation and analysis of multidimensional data have a critical impact on the design and performance of systems for objects recognition and indexing in digital signals. Examples of such signals are images or video signals. The major problem with conventional approaches is their high computational complexity, which usually increases exponentially with the data dimensionality. Another problem with existing methods is that they offer poor generalisation, e.g. their performance quickly decreases when more data becomes available. This is especially significant when new data is added which represents "classes" of signals that were not available at the system design or training stage.

One common solution to reduce the complexity problem is to reduce data dimensionality by Principal Component Analysis (PCA). PCA looks for the best-approximating linear subspace for all training vectors. Another technique, called Local PCA (LPCA) computes a set of local linear subspaces giving a better data approximation. Searching for a local linear approximation can be considered as a special case of a clustering process, and is commonly used by those skilled in the art. For example, the LPCA method has been successfully developed and applied for handwritten character recognition, as described in the paper entitled "Handwritten digit recognition by local principal component analysis" by Skarbek and Ignasiak, in "Foundations of Intelligent Systems", eds.: Z. W. Ras, A. Skowron, pp. 217-226, Lecture Notes in Computer Science, vol. 1325, Springer, 1997. A further improvement to LPCA can be obtained by combination with a fuzzy approach (Fuzzy-LPCA or FLPCA), as described by Bezdek, Coray, Gunderson, and Watson in "Detection and Characterization of Cluster Substructure. I. Linear structure: Fuzzy c-Lines", SIAM J. Appl. Math., vol.40, 1981 and Bezdek in "Pattern Recognition with Fuzzy Objective Function Algorithms", Plenum Press, 1981.

To assist in understanding the invention, brief summaries of the prior art techniques of PCA, LPCA and FLPCA follow.

Figure 1:
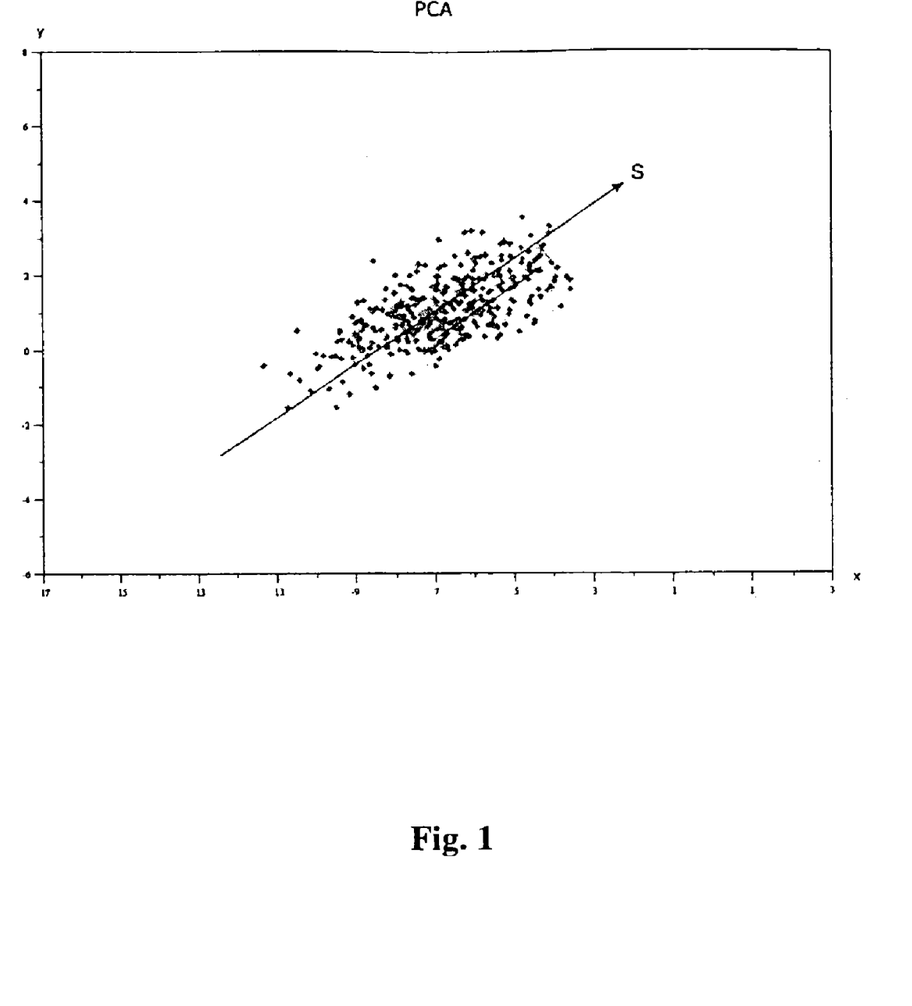
FIG. 1 is a graph illustrating PCA.

Principal component analysis is one of the most common methods used for reducing the dimension of data representation. It is based on orthogonal projection $P_S$ of n-dimensional data vector X into k-dimension linear subspace S (k<n). The subspace S is defined as one which minimizes the expected value E of the squared error between the data vectors Xi and their projections Ps(Xi) on the subspace S: $E\|X-P_S(X)\|^2$. FIG. 1 shows an example of a two-dimensional data distribution and one-dimensional subspace S.

Figure 2:
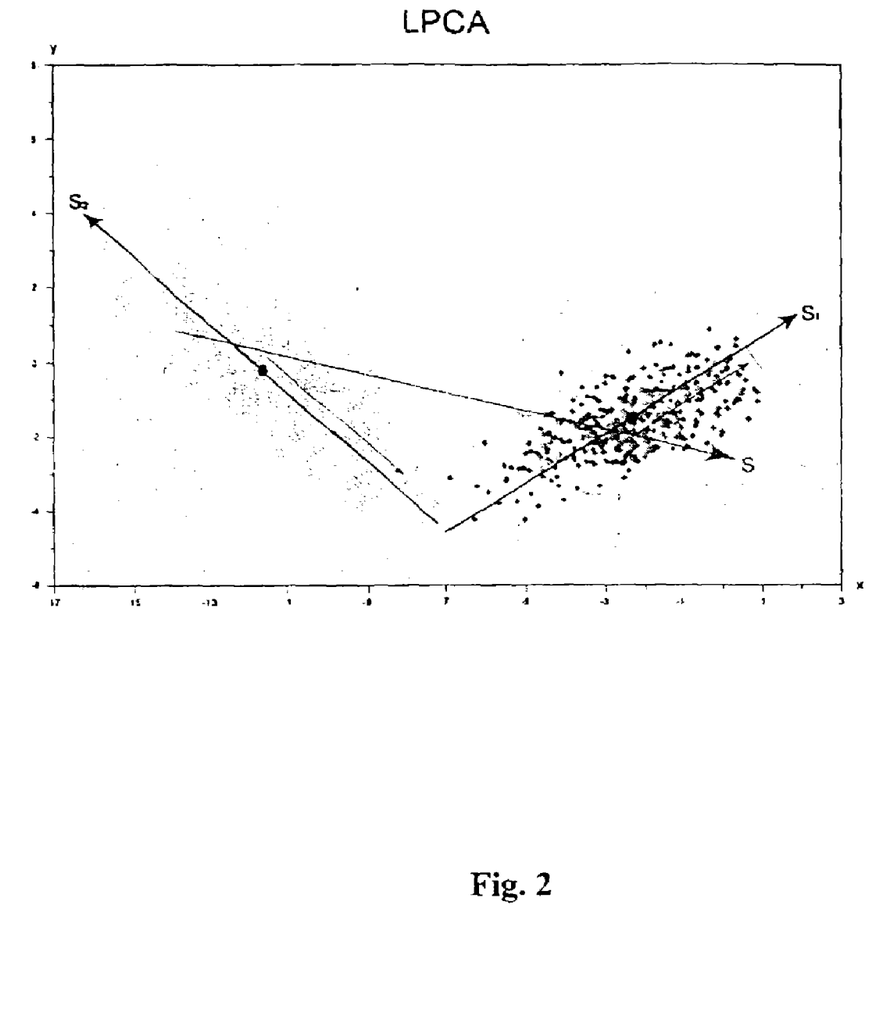
FIG. 2 is a graph illustrating LPCA.

FIG. 2 shows an example of data that is poorly approximated by a single linear subspace S. In such a situation Local PCA often gives a better representation. LPCA performs clustering of the data and uses a different linear model for each data cluster. In FIG. 2, the data is partitioned into two clusters, approximated well in two subspaces S1 and S2. Note that each data vector belongs to one cluster only, which is sometimes referred to as crisp clustering. A cluster proximity measure is used to decide to which cluster a data vector Xi belongs. Data vector belongs to a cluster which minimizes the corresponding cluster proximity measure. In local principal component analysis (LPCA) the proximity measure is usually chosen as the squared Euclidean distance from the vector Xi to the subspace defined by the cluster. The search for clusters and associated local subspaces is an optimization problem where the objective is to minimize the expected value of the error of the defined representation.

Figure 3:
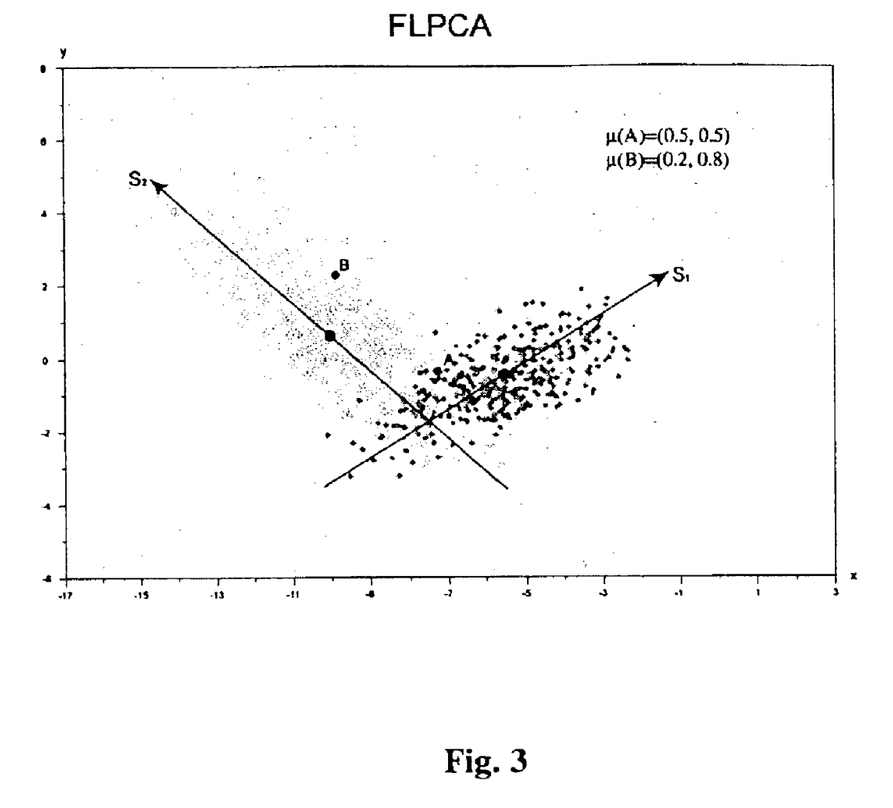
FIG. 3 is a graph illustrating FLPCA.

The main difference between the LPCA and FLPCA is that in the latter a data vector Xi may belong to more then one cluster, and the strength of association with each cluster may be different. In FLPCA the model consists of K fuzzy clusters defined in the object data space. Each fuzzy cluster is represented by the membership function $\mu(X)$ defined over the data space and taking values from the interval [0,1]. Membership values close to 1 correspond to a strong level of association and membership values close to zero to weak association. In the case of standard crisp clustering the membership value has only two levels—0 or 1. FIG. 3 shows an example where the model consists of two fuzzy clusters and the corresponding subspaces. Data vector XA belongs to both clusters with the same strength of association $\mu(XA))=(0,5, 05)$ while vector XB is associated more strongly with the cluster 2: $\mu(XB)=(0.2,0.8)$.

The PCA, LPCA and Fuzzy-LPCA approaches use a "data model", which is constructed based on a training data set. This model is used to extract compact vector descriptors of application data. It often happens that new data vectors that are poorly approximated by the model are later discovered. Such vectors give large reconstruction errors. One possible remedy is to build a new model, but then all previously computed descriptions must be discarded and recomputed again. This can be a serious problem, especially for applications cooperating in distributed environments.

This invention discloses a method for compact hierarchical representation of highly dimensional data which can be easily extended with backwards and forward compatibility. The method exhibits very good performance, particularly when applied for object-oriented image compression and recognition.

By way of example, consider the present invention applied to the problem of automated or assisted face recognition. The face recognition problem is a difficult one, as facial images exhibit large variability due to varying face poses, hair styles, presence of glasses or a moustache, or changes such as ageing. All these effects create many degrees of freedom for each individual and the existing face description schemes frequently do not model faces with a sufficient degree of accuracy. In order to solve this problem, a more flexible and adaptive "face model" is necessary. However, this creates a problem because any change in the model used in existing approaches requires that all descriptors are recomputed.

The proposed invention shows how to construct and maintain an adaptive model that supports backward and forward compatibility between descriptors derived using the existing and pre-existing instantiations of the model. Changes can be made to the data model when there is some evidence that the current model does not reflect well the data or portion of the data; for example when the retrieval performance deteriorates for some or all of the data. Backward compatibility is fully supported—new descriptors can be easily compared with pre-existing descriptors by applications using the pre-existing model for descriptor extraction. Both new and pre-existing descriptors can be used in the search or other processing at the same time without any conversion to a common format. For instance if a query is made involving a descriptor based on the pre-existing model on the database where descriptors were extracted using the newer (updated) model, the system response is equivalent to a situation when all descriptors were based on the pre-existing model.

The invention also discloses a method for compact hierarchical representation of highly dimensional data. The data vector is described as a set of partial descriptors of lower dimensionality. Each partial descriptor relates to a data cluster which is modeled in fuzzy local linear subspace. Each partial descriptor of the data vector includes its cluster membership degree and the data vector coordinates in the local subspace(s). The hierarchical model obtained for the training data can be used to represent other data in the same application domain. The proposed model is extensible, i.e. when the existing model fails to represent the data with sufficient accuracy then it can be refined. The refined model is backward compatible, i.e. the descriptors expressed in the original model are correctly interpreted (decoded) by applications using the refined model. Moreover, forward compatibility is achieved, as applications using the original model can decode the descriptors calculated by using the refined model. The method exhibits very good performance, particularly when applied to object oriented image compression and recognition.

Generally speaking, the invention provides a method of analysing and/or representing a data distribution comprising deriving an approximate representation of the data distribution and analysing the errors of the data elements when expressed in terms of the approximate representation. The method is recursive—in other words, the analysis of the errors involves deriving an approximate representation of the distribution of the errors and then analysing the resulting errors and so on, until termination criteria are met as appropriate. More specifically, the data elements are multi-dimensional and the approximate representation is a subspace of the data space. Preferably, the subspace is derived using principal component analysis. Usually the analysis of the errors involves clustering, and preferably the clustering is fuzzy clustering using a membership function representing the degree of membership to a cluster. Preferably, the errors are also analysed using principal component analysis, ie using fuzzy local principal component analysis for clusters to produce a subspace representative of each cluster. The steps of expressing the clusters in terms of a subspace and analysing the resulting errors (fuzzy local PCA) are repeated to produce a hierarchical tree structure with nodes corresponding to the subspaces derived at each stage.

The tree model can be extended by using new data to add new nodes to the tree.

The invention also provides a method of representing a data element comprising expressing it in terms of the subspaces of the tree structure, and the resulting descriptor, which comprising a top descriptor corresponding to the top node and partial descriptors corresponding to lower level nodes. Preferably, each partial descriptor comprises a node identifier, coefficients in the node subspace and optionally a membership value.

The invention also provides a method of matching descriptors expressed as described above, for example, for matching, browsing, searching and classifying purposes.

The invention also provides an apparatus, such as a computer, set up to executing a method as described above, and a computer program for executing such a method and a computer-readable storage medium storing such a program.

In the preferred embodiments, the invention is for analysing data derived from objects or images by processing signals corresponding to objects or images. A particular application of the invention is in connection with representations of people, for example, faces, and face recognition.

In the following description, the technique of embodiments of the invention will be described as hierarchical fuzzy linear principal component analysis (HFLPCA).

Embodiments of the invention will be described with reference to the accompanying drawings of which.

The general principles underlying the invention will be described first, followed by a description of an embodiment of the invention.

Figure 4:
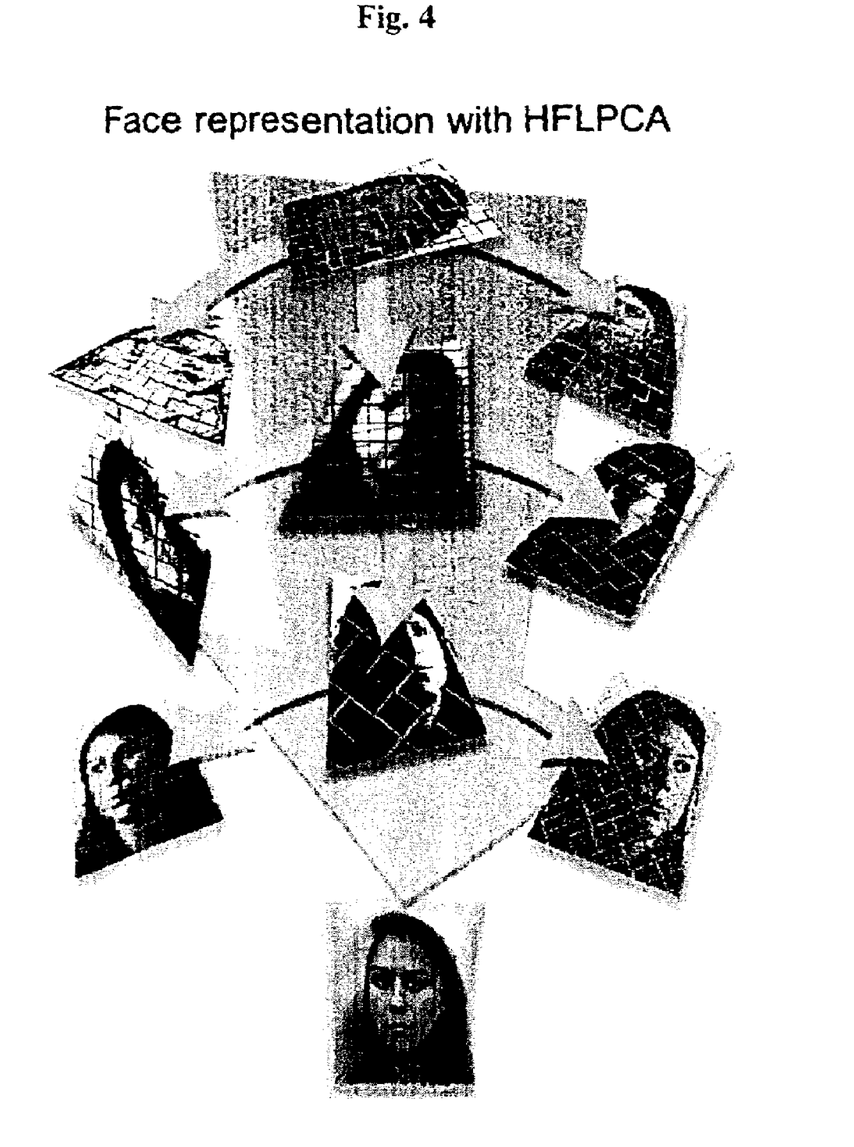
FIG. 4 is a pictorial illustration of the tree structure using facial images.

The key idea behind the HFLPCA technique is to construct a multi-level hierarchical representation of the data that is mapped on a tree structure. The idea is shown pictorially in FIG. 4 as applied to face images.

Figure 5:
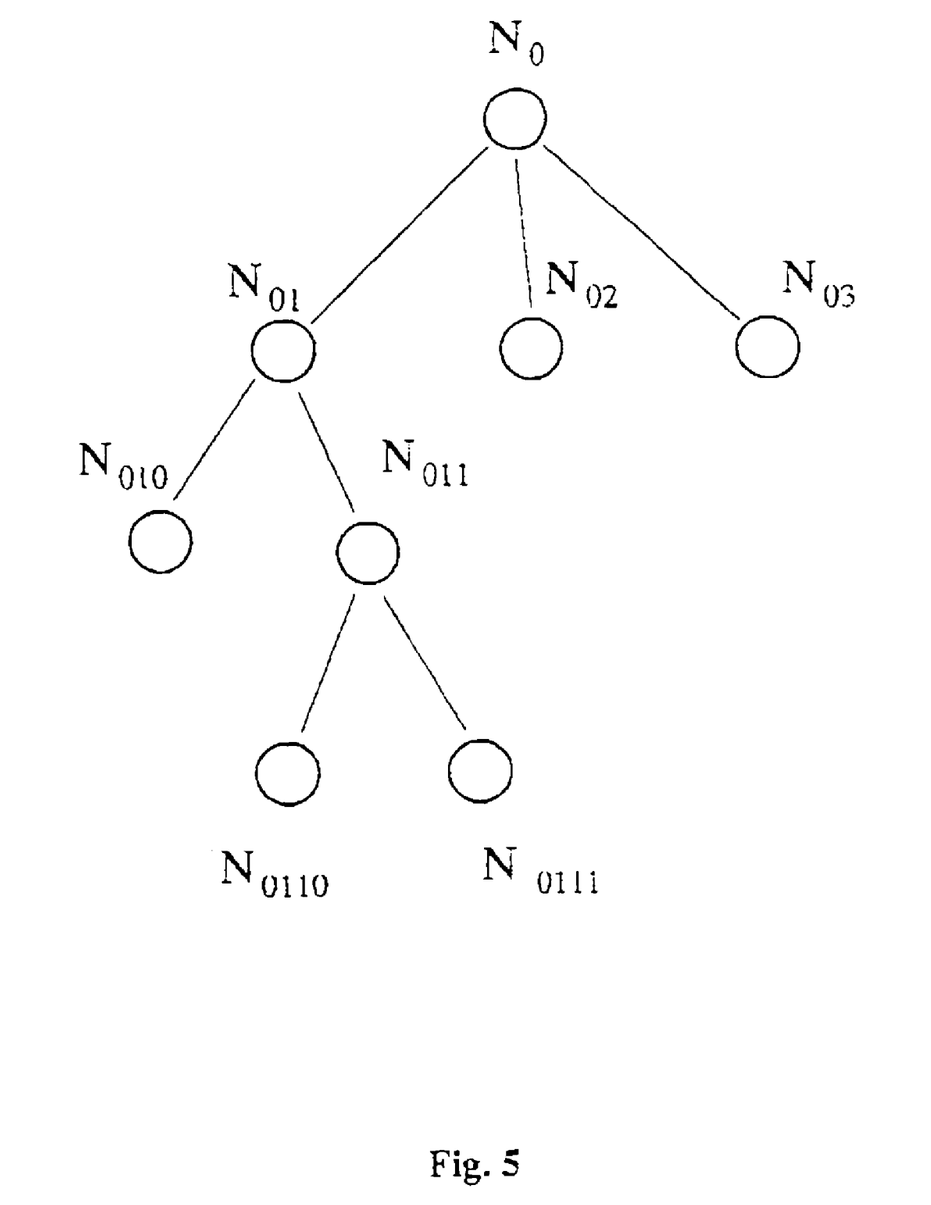
FIG. 5 is a diagram illustrating a tree structure of a HFLPCA representation.

More specifically, the new data model shown by the invention consists of a tree of fuzzy linear models (FIG. 5). The representation has a hierarchical structure. The root node N0 corresponds to the conventional PCA description of the data, that is it represents a k0 dimensional subspace of the original n-dimensional data-space. Usually, this first approximation of the data with PCA has poor accuracy, which is reflected in the large values of the residual errors for the data vectors. These residual errors are now clustered and represented using the FLPCA method. Each cluster of the residual error has a corresponding child node. In FIG. 5, the root node N0 has three children N01, N02, N03, which means that there are three clusters in the residual error data. The model of each node (cluster) comprises of the single reference point C(k) and the linear subspace anchored at C(k) which is spanned by orthogonal normalized vector base W(k) (k is the node/cluster index, e.g. 01, 02, 011). Now the residual errors on the second level of representation are computed. The hierarchy is further extended by adding recursively further layers in the hierarchy (children nodes) until all data is represented with sufficient accuracy. There could be alternative or additional termination conditions, for example the depth of the tree could be constrained.

Any node in the tree represents a cluster in the residual data set E(k) which consists of all representation errors for the parent node model with index k. In order to achieve compact representation, quantisation may be applied to representation coefficients. We refer to this as quantised mode. When quantised mode is used in the building of the model, the residual data is computed after quantisation of coefficients in the node base. For example, residual errors for node N011 are computed using quantised coefficients for nodes N01 and N0.

The children of a node are computed by the Fuzzy Local PCA (FLPCA) procedure applied to the residual errors of the data representation belonging to this node. The node becomes a leaf node if all data belonging to this node is represented with sufficient accuracy, for example when the variance of residual errors is below some predetermined threshold. If the variance of the residual errors in a node exceeds the variance threshold, the FLPCA technique is applied and a further level in the hierarchy is added to this node.

The model can be easily extended when new data becomes available. New data vectors for which representation accuracy is not sufficient (e.g. outliers) are recorded during the model exploitation at each node including the root node. When the representation error variance in the outlier set exceeds some predetermined threshold, the HFLPCA technique is applied to the outlier set only and the new nodes (clusters) are added at appropriate locations in the tree.

Figure 6:
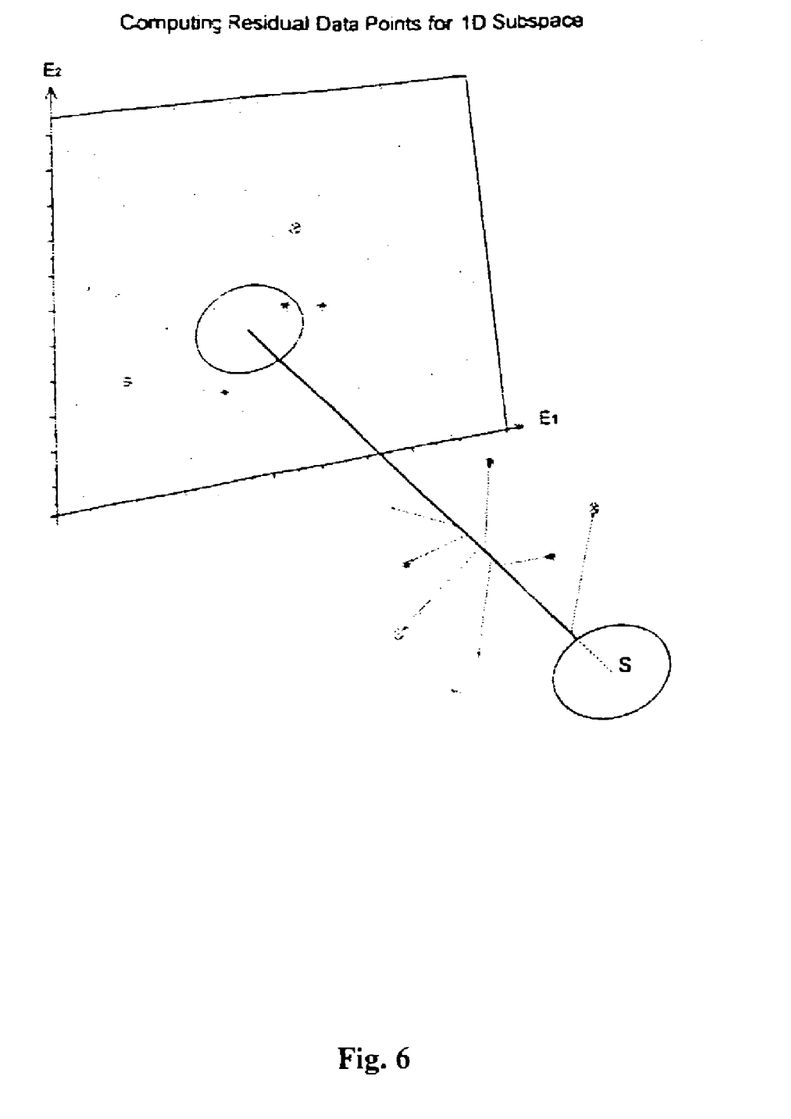
FIG. 6 is a graph illustrating a step in the method of deriving a HFLPCA representation.

FIG. 6 shows an example where the three-dimensional data vectors are represented in one-dimensional subspace S. For each vector shown, the errors of the representation are seen on the error subspace (plane) E1E2.

Figure 7:
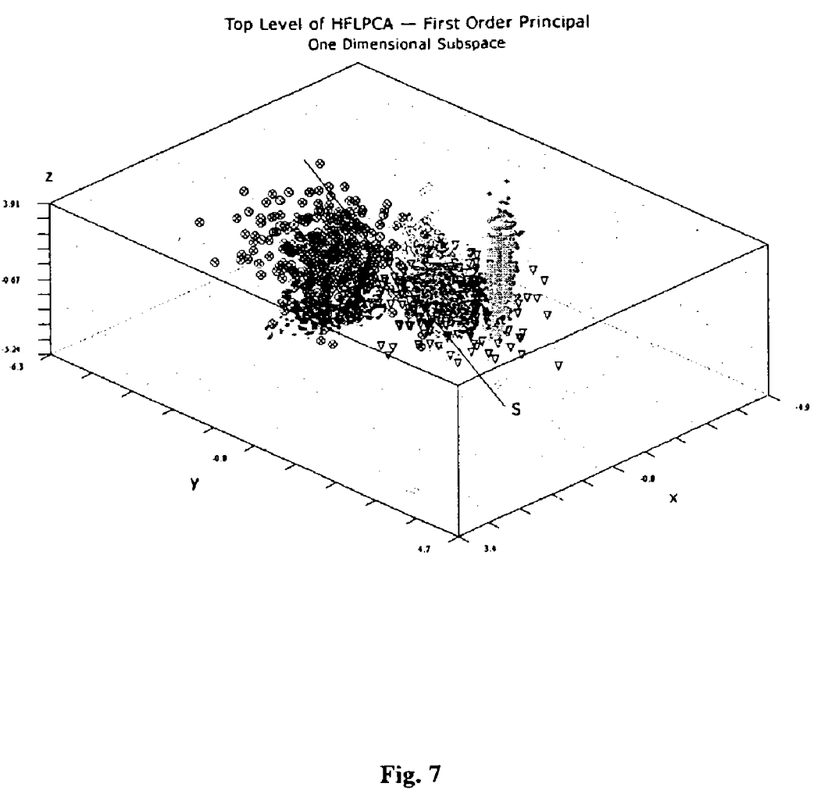
FIG. 7 is a graph showing a data distribution and the corresponding top level of the HFLPCA tree structure.
Figure 8:
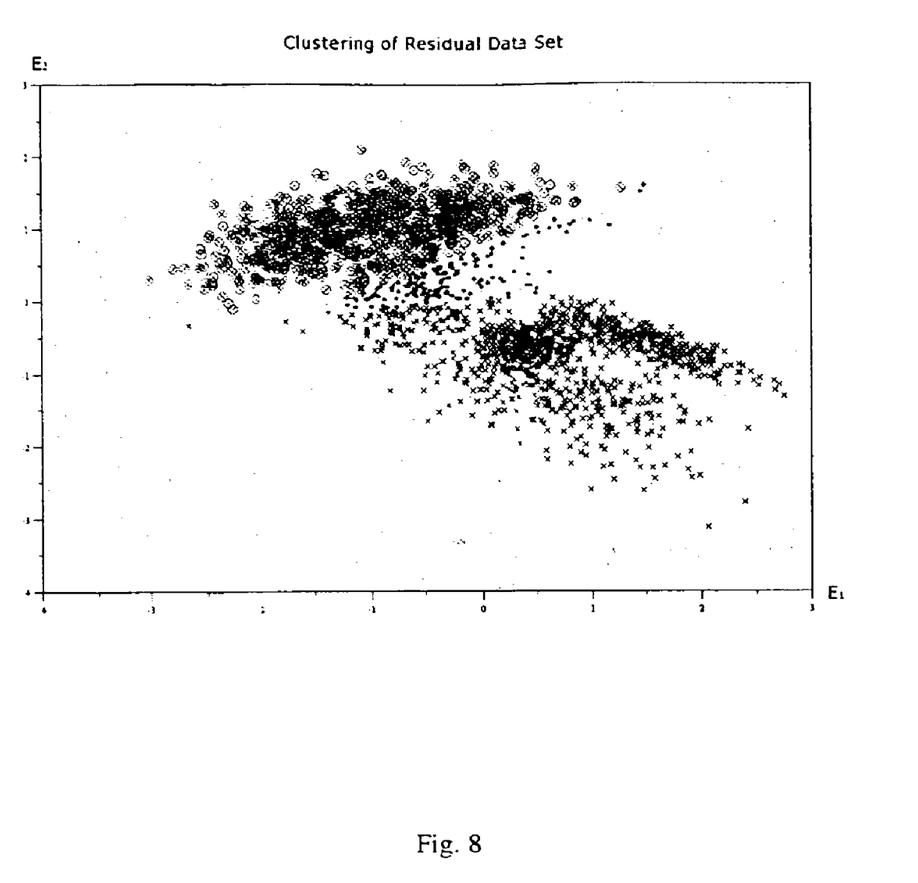
FIG. 8 is a graph showing the distribution of the residual data corresponding to the data in FIG. 7.

FIGS. 7 and 8 show a similar example with more data points. Clusters are clearly visible in the E1E2 error subspace (FIG. 8).

A data vector is represented by a combined descriptor (or a collection of partial descriptors, referred to as a descriptor collection), which is constructed by concatenating or linking all partial descriptors corresponding to the nodes in the subtree defined by the fuzzy clusters to which the data vector belongs, and some additional control bits.

The descriptor collection always includes the root partial descriptor, which is the vector of coefficients in the root vector base.

The partial descriptor of the data vector for any other node than root consists of the node identifier, the membership value (ie obtained from the membership function for fuzzy clustering) in respect to the node cluster and the coefficients of the vector projections on the node subspace which are calculated in the vector base of this subspace.

The partial descriptor for any other node than root is included in the descriptor collection for the particular data vector if and only if the representation error at this node exceeds a threshold and the data vector membership to this node cluster exceeds another threshold value.

In the quantised mode, the coefficients and values of membership functions are quantized.

Figure 9A:
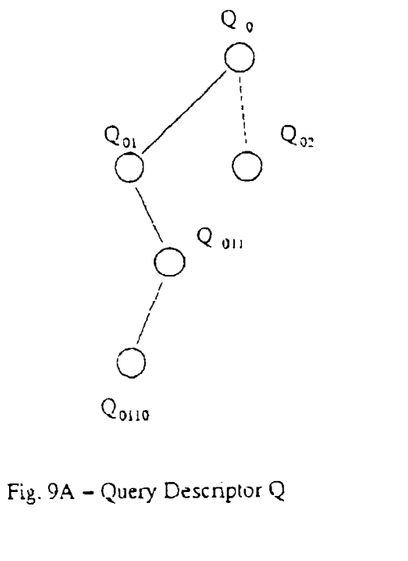
FIG. 9 is a graph illustrating matching of the descriptors.
Figure 9B:
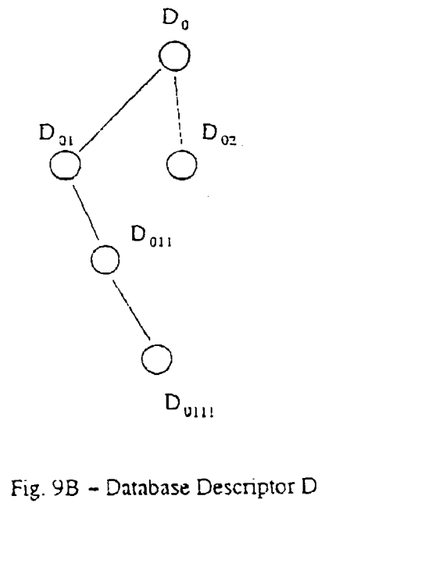
Figure 9C:
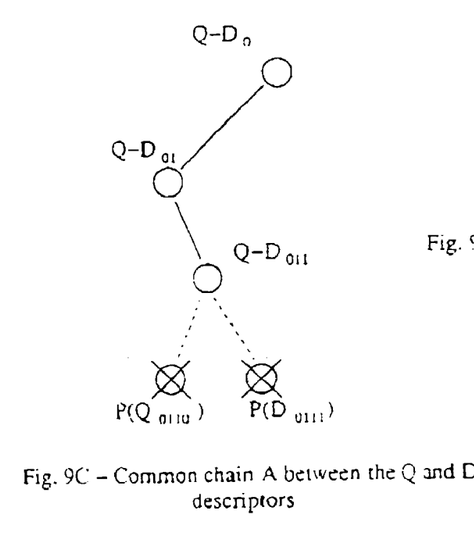
Figure 9D:
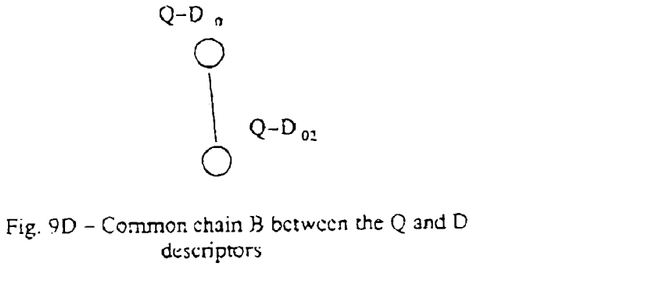

The distance from a query descriptor Q to a data descriptor D can be computed by finding all common chains in the tree representations of the Q and D descriptors and selecting the distance (e.g. the overall error measure) associated with the chain that minimizes that distance. The distance is computed by summing up partial error measures between partial descriptors associated with each node in the chain under consideration and an additional penalty corresponding to the parts of the representation that are not present in the common chain. Such a penalty may, for example, depend on the representation errors for descriptors Q and D relative to the last common node in the common chain. To increase the efficiency, the penalty values for database descriptors may be pre-computed and stored as part of each descriptor. FIG. 9 shows an example of matching between two descriptors Q (FIG. 9A) and D (FIG. 9B) constructed based on the model tree shown in FIG. 5. There are two common chains: chain A (FIG. 9C) and chain B (FIG. 9D). The distance for chain A is the sum of the distances between component descriptors associated with the common nodes Q-D0, Q-D01, Q-D011 and the penalties P(Q0110) and P(D0111) associated with the nodes Q0110 and D0111 which are not present in the common chain A. The distance for chain B is simply the sum of the distances between component descriptors associated with the common nodes Q-D0 and Q-D02. In the case of chain B there is no penalty component as there are no missing nodes.

The compatibility between the old model representations and the new model representations is based on the concept of hierarchical extension of the model.

Interoperability is achieved in the following way:

When a model is extended, all descriptors based on the pre-existing model can also be extended by preserving partial descriptions for the pre-existing tree nodes and by adding partial descriptions for newly added tree nodes A descriptor expressed in the "new" model can be mapped into the pre-existing model by simply removing (or not considering during the query stage) all partial descriptors which correspond to newly introduced nodes in the model trees;

Matching between the pre-existing and new descriptors can be easily accomplished because the pre-existing description is always a subset of the newer description and thus can be recognized as a valid description. The matching can be accomplished by directly applying the similarity function to the descriptors, even if they are extracted by using different models.

The preferred embodiment contains three main elements: Model Builder, Descriptor Database Builder, and Query Handler.

Model Builder

Model Builder is responsible for the construction of the data Model comprising a model tree structure and a set of reference points C(k) and normalized vector bases W(k) associated with each node k of the model tree. The root node is modeled using PCA, and each subsequent lower level in the hierarchy is defined by a FLPCA model.

The Model is built using a set of N dimensional training vector data samples $XT=[X_1, \ldots, X_L]$.

The PCA model associated with the root node is built by using SVD (Singular Value Decomposition) applied directly to the training vector set XT.

The FLPCA model for the given tree node is built for representation error data which is obtained at this node of tree model. FLPCA is implemented with the fuzzy varieties clustering algorithm described in the Bezdek papers mentioned above.

Model Builder works in two modes: expansion and extension mode. Expansion mode is used for creation of the first version of the Model while extension is used to update it. Both expansion mode and extension modes use the same FLPCA procedure, but for different input data: expansion mode uses the original dataset, whilst extension mode exploits the outlier dataset for the given tree node, i.e. the data which does not fit to sub-models found already at the node.

Descriptor Database Builder

Descriptor database builder is responsible for extraction of descriptors from the input images and for construction of the database. An input data vector Xi is represented by a descriptor comprising a subtree of the model tree, the associated set of component descriptors and the values of membership of vector Xi to each cluster present in the subtree. The subtree specifies which nodes of the model tree are used for a description (i.e. are active). It is expressed as a vector of bits, where bit value 1 indicates an active node (i.e. this tree node belongs to the sub-tree and is used in description) and value zero indicates a passive node.

The root level component descriptor is computed as the dot product of a data vector (Xi-C0) and the vectors from the normalized vector base W(0) associated with the root node.

A component descriptor associated with a non-root node k (k>0) is computed using the dot product of a centroid (C(k))

shifted residual error vector $(R_k(Xi)-C(k))$ at node k with the normalized vector base W(k) associated with the k-th node. The residual $R_k(Xi)$ at node k is computed as a difference between the vector Xi and its reconstruction at that node.

The complete descriptor of the data vector Xi contains only component descriptors associated with tree nodes for which the values of the associated membership functions are above a predetermined threshold.

Query Handler

Query handler is responsible for the process of searching the database. Here we describe a query by example. An example image is presented to the Query Handler and the descriptor Q is extracted from the image using the extraction component of the Database Builder.

The distance measure between the query descriptor Q and each descriptor D in the database is computed as described in the preceding section. The penalty for the node i is defined as the squared Euclidean norm of the representation error at this node. The element of the database which minimizes the distance measure is selected as the best match.

A method and apparatus according to an embodiment of the invention will be described with reference to FIG. 10.

Figure 10:
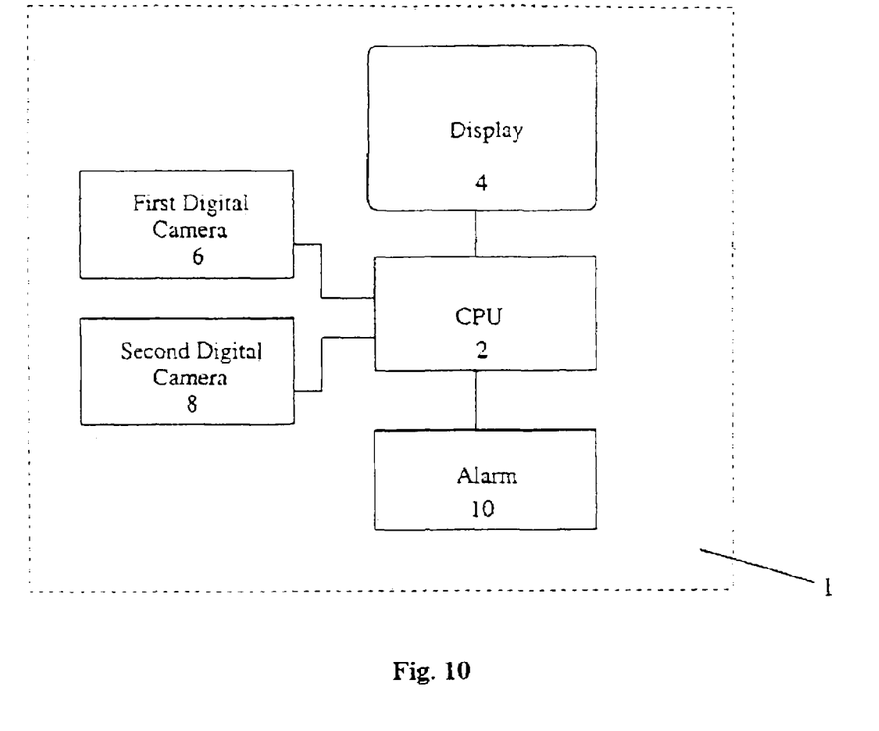
FIG. 10 illustrates an apparatus according to an embodiment of the invention.

FIG. 10 illustrates a surveillance system used, for example, in an office where it is important that only authorised persons are given access.

As shown in FIG. 10, the system 1 includes a computer comprising a central processing unit (CPU) 2 including processors, memories etc, and a display 4. The system also includes first and second digital cameras 6, 8 and an alarm 10, all connected to the CPU 2. The first digital camera 6 is for setting up the system 1 and the second digital camera is located in reception of the office buildings, for taking photographs of visitors.

During the system development stage a generic Model of human face (HFM) is built as described in the Model Builder to produce a generic tree structure. A large number of face images under varying conditions, such as illumination, pose, etc, is used at this stage.

The system is tuned to the specific location (office) by taking photographs of people who are authorised to be in the office buildings, eg employees and known visitors. For each such person, a number of photographs are taken using the first digital camera. Preferably, a large number of photographs are taken. For each person, photographs are taken under different conditions. For example, the photographs are taken under varying lighting conditions, in different poses, when the person is wearing different outfits, clothing, hats, glasses, and with different hairstyles and colours, as appropriate. These photographs are downloaded to the computer. For each photograph, the head region is located, the background is cropped and the head region is resized to form an image having a predetermined size in pixels. For example, techniques such as described in our co-pending application no. GB 2 357 650 A could be used. The RGB values for each of the pixels in the resized head image are combined to form the feature vector for the image. Thus, the dimension of the feature vector depends on the number of pixels in the resized head image. For example, if the resized image size is 25×30 pixels, then the dimension of the feature vector is 25×30.

All the feature vectors for one person form the training set for the person and are used to produce a HFLPCA representation of that person's appearance. More specifically, the feature vectors for each person are expressed in terms of the generic tree structure mentioned above. In other words, each of the feature vectors is expressed in the form of a descriptor as described above in descriptor database builder, ie a subtree, (the relevant nodes of the generic tree structure), and corresponding component descriptors and membership values. The combination of all subtrees for all the feature vectors for one person can be considered as a universal individual subtree for the person. Generally speaking, the nodes of the universal individual subtree representation can be considered to correspond approximately to images of the person under different conditions. For example, referring to FIG. 4, the top level is a general description of the person, and the three nodes in the second level correspond to the person looking straight ahead, to the left and to the right. The two nodes in the third level, descended from the first node in the second level, are the person looking straight ahead and photographed under dark and light conditions, and the two nodes in the fourth level represent the person looking ahead under light conditions wearing make-up and not wearing make-up respectively.

The HFLPCA representation of the person is stored in the computer. More specifically, the descriptors (subtrees, component descriptors and membership function values associated with each node of the subtree) are stored.

HFLPCA representations are similarly derived and stored for each authorised person.

When a person arrives at the office, they stand in front of the second digital camera in reception, and it is operated to take a photograph. The photograph is sent to the computer, where the face region is cropped, resized and converted into a query feature vector as described above for the setting up.

The query feature vector is then expressed in terms of the generic tree structure to produce a query descriptor, and the query descriptor is compared with the stored representations of authorised persons. More specifically, for each stored individual representation, the query descriptor is compared with the stored descriptors using a matching technique as described above. If the resulting smallest distance (over all the descriptors for the stored person) is less than a predetermined threshold, then the query is treated as a match. If a match is found, so that the person is recognised, an image of the person is displayed on the display 4 and the person is permitted to proceed. If the resulting smallest distance for the stored person is greater than a predetermined threshold, then the query is rejected. If the query descriptor is rejected for one person, the matching procedure is repeated for the next person, using the next stored HFLPCA representation, and so on. Alternatively, instead of doing a sequential matching as described above, the stored representations for all people are all compared with the query descriptor, and the resulting distances examined (eg all the resulting distances or the smallest distances for each person, or the smallest distance for each person under a predetermined threshold). For example, the smallest resulting distance, assuming it is less than the predetermined threshold, is treated as the matching person. If there is no distance below the threshold then the query is rejected. If, after all the stored representations have been considered, no match is found, the alarm 10 is sounded.

The camera may be in different locations, for example, outside the office buildings such as at the gate. A video camera could be used instead of a still camera. The camera may take images of people automatically although extraction of the face region may then become more complex. The derivation of the feature vector is not limited as described above. For example, the feature vector may be derived using different image sizes, different quantisation, grayscale values instead of colour, and other processing steps may be included, such as averaging of pixel values. The pictures taken of people by the second digital camera may be used to update the stored representation. Representations may also be stored of known people it is desired to exclude, such as ex-employees, and an alarm is sounded when these people are matched.

The performance of the system may drop as a result of new people being added to the database. One of the reasons for this is that the human face model (HFM) extracted during the system development stage may not describe some faces with the sufficient precision. We refer to such faces as outliers. From time to time, the HFM model can be updated, based on the set of outlier faces collected during use. As explained earlier, such an update will not necessitate an update to all exisiting descriptors stored in the system.

The invention is not limited to surveillance and face recognition but can be used in various applications. For example, it can be used generally for object recognition and matching, and image matching such as in searching image databases.

The invention has been described in the context of still and moving images, but it can applied in numerous contexts, such as handwriting character recognition, radar, sonar or acoustic signals signal recognition and in other applications, especially those which essentially rely on some form of pattern recognition and involve high-dimension data.

The invention claimed is:

1. A method of providing an electronic representation of data distribution of data elements derived from a plurality of images for at least one object or image by processing signals corresponding to the plurality of images, the representation having a hierarchical structure, the method comprising:
   (a) deriving an approximate representation of input data, derived from a plurality of images, the input data comprising the data distribution, the approximate representation comprising a plurality of data elements and forming a node in the hierarchical representation;
   (b) deriving error data comprising errors of the data elements of the approximate representation;
   (c) analysing the error data, to determine if the errors of the data elements meet predetermined criteria, and
   (d) if the step of analysing determines that the errors of the data elements meet the predetermined criteria, marking the node as a leaf node in the hierarchical representation, or
   (e) if the step of analysing determines that the errors of the data elements do not meet the predetermined criteria, repeating steps (a) to (d) recursively, using the error data as the data distribution, to form one or more further nodes in the hierarchical representation, and
   (f) storing the final electronic representation of the data distribution of data elements comprising the nodes in a hierarchical representation on an electronic storage medium for use in image analysis.

2. A method as claimed in claim 1, wherein the approximate representation comprises data elements in a subspace of a data space of the data distribution of the input data.

3. A method as claimed in claim 2, wherein the subspace is derived using principal component analysis.

4. A method as claimed in claim 1, wherein step (e) further comprises:
   (i) prior to repeating steps (a) to (d), clustering the errors of the data elements of the approximate representation to obtain a plurality of clusters;
   (ii) marking each cluster as a child node, and
   (iii) repeating steps (a) to (d) recursively for each cluster, using the error data for the given cluster as the data distribution, to form one or more further nodes in the hierarchical representation.

5. A method as claimed in claim 4, wherein the step of clustering involves fuzzy clustering using a membership function representing the degree of membership to a cluster.

6. A method as claimed in claim 4, wherein the step (e) (iii) further comprises:
   (iv) for each cluster, deriving an approximate representation comprising a subspace representative of the cluster, using principal component analysis, each approximate representation forming a further node in the hierarchical representation.

7. A method as claimed in claim 6, wherein step (e) (iii) further comprises:
   (v) for data elements in an approximate representation of a given cluster, deriving errors of the elements in the cluster subspace, and
   (vi) analysing data elements of the errors.

8. A method as claimed in claim 7, wherein step (e) (iii) comprises:
   repeating steps (v) to (vi) to produce further nodes in a hierarchical tree structure.

9. A method as claimed in claim 7, wherein step (e) (v) further comprises:
   (vii) stopping the method if the step of analysing determines that the data elements meet predetermined criteria.

10. A method as claimed in claim 8, further comprising:
    adding new nodes to the hierarchical tree structure by processing new input data.

11. A method of representing an image of an object or image by processing signals corresponding to the image, the method comprising:
    providing a data model of the object or image as an electronic representation of a data distribution of data elements derived from a plurality of images for the object or image by processing signals corresponding to the plurality of images, the representation having a hierarchical structure, the data model constructed by the steps of:
    (a) deriving an approximate representation of input data, derived from a plurality of images, the input data comprising the data distribution, the approximate representation comprising a plurality of data elements and forming a node in the hierarchical representation;
    (b) deriving error data comprising errors of the data elements of the approximate representation;
    (c) analysing the error data, to determine if the errors of the data elements meet predetermined criteria, and
    (d) if the step of analysing determines that the errors of the data elements meet the predetermined criteria, marking the node as a leaf in the hierarchical representation, or
    (e) if the step of analysing determines that the errors of the data elements do not meet the predetermined criteria, repeating steps (a) to (d) recursively, using the error data as the data distribution, to form one or more further nodes in the hierarchical representation, and
    (f) providing the final data model as the electronic representation of the data distribution of data elements comprising the nodes in a hierarchical representation on a computer readable storage medium;
    the method further comprising:
    deriving a feature vector of the image, and
    processing the feature vector of the image to derive a representation of the image in terms of the data model.

12. A method in claim 11 comprising expressing the feature vector in terms of a tree structure having nodes and determining feature vector of the element for nodes of the tree structure.

13. A method as claimed in claim 12 comprising using a membership value representing the degree to which the feature vector corresponds to a node.

14. A method as claimed in claim 13 comprising quantizing the coefficients and/or the membership values.

15. A method as claimed in claim 1 involving data derived from an image or images in a sequence of images.

16. A method as claimed in claim 1 wherein the object or image corresponds to a person or a face.

17. A method of matching or classifying a query feature vector derived from an image of an object or image by processing signals corresponding to the object or image, the method comprising comparing a descriptor of the query feature vector derived using the method of claim 11 with descriptors derived from feature vectors of a plurality of images in a database using the method of claim 11, the step of comparing using a matching function. and outputting an image matching or classification result.

18. An apparatus for providing an electronic representation of data distribution of data elements derived from a plurality of images for at least one object or image by processing signals corresponding to the plurality of images, the representation having a hierarchical structure, comprising:
  a processor configured to perform the steps of:
    (a) deriving an approximate representation of input data, derived from a plurality of images, the input data comprising the data distribution, the approximate representation comprising a plurality of data elements and forming a node in the hierarchical representation;
    (b) deriving error data comprising errors of the data elements of the approximate representation;
    (c) analysing the error data, to determine if the errors of the data elements meet predetermined criteria, and
    (d) if the step of analysing determines that the errors of the data elements meet the predetermined criteria, marking the node as a leaf node in the hierarchical representation, or
    (e) if the step of analysing determines that the errors of the data elements do not meet the predetermined criteria, repeating steps (a) to (d) recursively, using the error data as the data distribution, to form one or more further nodes in the hierarchical representation, and
  a memory for storing the final electronic representation of the data distribution of data elements comprising the nodes in a hierarchical representation for use in image analysis.

19. The apparatus as claimed in claim 18 further comprising an image or object input means.

20. A computer-readable medium having stored thereon computer executable program for providing an electronic representation of data distribution of data elements derived from a plurality of images for at least one objet or image by processing signals corresponding to the plurality of images, the representation having a hierarchical structure, the computer program when executed causes a computer system to execute steps of:
  (a) deriving an approximate representation of input data, derived from a plurality of images, the input data comprising the data distribution, the approximate representation comprising a plurality of data elements and forming a node in the hierarchical representation;
  (b) deriving error data comprising errors of the data elements of the approximate representation;
  (c) analysing the error data, to determine if the errors of the data elements meet predetermined criteria, and
  (d) if the step of analysing determines that the errors of the data elements meet the predetermined criteria, marking the node as a leaf in the hierarchical representation, or
  (e) if the step of analysing determines that the errors of the data elements do not meet the predetermined criteria, repeating steps (a) to (d) recursively, using the error data as the data distribution, to form one or more further nodes in the hierarchical representation, and
  (f) storing the final electronic representation of the data distribution of data elements comprising the nodes in a hierarchical representation on an electronic storage medium for use in image analysis.

21. The method of claim 1, wherein the input image data is derived from the plurality of images by deriving a feature vector for each image of the plurality of images.

22. The method of claim 21, wherein the data distribution comprises a plurality of feature vectors corresponding to the plurality of images.

23. The method of claim 21, wherein:
  step (b) comprises deriving error data comprising errors of representing the feature vectors using the approximate representation; and
  step (c) comprises analysing the error data, to determine if the errors of the feature vectors meet predetermined criteria.

24. A method of providing an adaptive electronic image data model representation derived from a plurality of images of at least one object or image by processing signals corresponding to the plurality of images, the image data model representation having a hierarchical structure, the method comprising:
  (a) deriving an approximate representation of input image data derived from a plurality of images, the approximate representation comprising a plurality of data elements and forming a node in the hierarchical representation;
  (b) deriving error data comprising errors of the data elements of the approximate representation;
  (c) analysing the error data, to determine if the errors of the data elements meet predetermined criteria, and
  (d) if the step of analysing determines that the errors of the data elements meet the predetermined criteria, marking the node as a leaf node in the hierarchical representation, or
  (e) if the step of analysing determines that the errors of the data elements do not meet the predetermined criteria, repeating steps (a) to (d) recursively, using the error data as the data distribution, to form one or more further nodes in the hierarchical representation, and
  (f) storing the final electronic image data model representation comprising the nodes in a hierarchical representation in an electronic storage medium for use in image analysis.

25. A method of producing a generic electronic data model of the appearance of an object in an image using a plurality of images of the object, by processing signals corresponding to the plurality of images, the electronic data model having a hierarchical structure, the method comprising:
  (a) deriving an approximate representation of input data derived from the plurality of images, the input data comprising a data distribution of feature vectors corresponding to the plurality of images, the approximate representation forming a node in the hierarchical representation;
  (b) deriving error data comprising errors of representing the feature vectors using the approximate representation;
  (c) analysing the error data, to determine if the errors of the feature vectors meet predetermined criteria, and
  (d) if the step of analysing determines that the errors of the feature vectors meet the predetermined criteria, marking the node as a leaf node in the hierarchical data model, or
  (e) if the step of analysing determines that the errors of the feature vectors do not meet the predetermined criteria, repeating steps (a) to (d) recursively, using the error data as the input data, to form one or more further nodes in the hierarchical data model, and (f) storing the final hierarchical electronic data model comprising the nodes in an electronic storage medium for use in image analysis.

26. A computer-readable medium having stored thereon computer executable program for representing an image of an object or image by processing signals corresponding to the image, the computer program when executed causes a computer system to execute steps of:

provoking a data model of the object or image an electronic representation of data distribution of data elements derived from a plurality of images for at least one object or image by processing signals corresponding to the plurality of images, the representation having a hierarchical structure, the data model constructed by the steps of:

(a) deriving an approximate representation of input data, derived from a plurality of images, the input data comprising the data distribution, the approximate representation comprising a plurality of data elements and forming a node in the hierarchical representation;

(b) deriving error data comprising errors of the data elements of the approximate representation;

(c) analysing the error data, to determine if the errors of the data elements meet predetermined criteria, and (d) if the step of analysing determines that the errors of the data elements meet the predetermined criteria, marking the node as a leaf in the hierarchical representation, or (e) if the step of analysing determines that the errors of the data elements do not meet the predetermined criteria, repeating steps (a) to (d) recursively, using the error data as the data distribution, to form one or more further nodes in the hierarchical representation, and (f) providing the final data model as the electronic representation of the data distribution of data elements comprising the nodes in a hierarchical representation on a computer readable storage medium;

deriving a feature vector of the image, and processing the feature vector of the image to derive a representation of the image in terms of the data model.

27. A computer-readable medium having stored thereon computer executable program for matching or classifying a query feature vector derived from an image of an object or image by processing signals corresponding to the object or image, the computer program when executed causes a computer system to execute steps of:

comparing a descriptor of the query feature vector derived using the method of claim 11 with descriptors derived from feature vectors of a plurality of images in a database using the method of claim 11, the step of comparing using a matching function, and outputting an image matching or classification result.

* * * * *